United States Patent [19]

Dulak

[11] Patent Number: 5,464,067

[45] Date of Patent: Nov. 7, 1995

[54] GOLF MARKER CLEANER AND GRASS REMOVER

[76] Inventor: Joseph O. Dulak, 252 E. Broadway, Owatonna, Minn. 55060

[21] Appl. No.: 180,055

[22] Filed: Jan. 11, 1994

[51] Int. Cl.$^6$ .................................................. A01B 45/04
[52] U.S. Cl. ............................ 172/13; 172/19; 30/DIG. 7
[58] Field of Search .................................. 172/21–25, 13, 172/19; 30/DIG. 5–DIG. 7, 301, 286; 56/DIG. 20; 166/96

[56] References Cited

U.S. PATENT DOCUMENTS

| 731,977 | 6/1983 | Titus | 172/25 |
|---|---|---|---|
| 791,955 | 6/1905 | Thompson | 172/25 |
| 1,340,927 | 5/1920 | Whitman . | |
| 2,764,926 | 10/1956 | Heimbigner | 172/24 |
| 2,896,729 | 7/1959 | Brechlin | 172/19 |
| 2,991,838 | 7/1961 | Lane . | |
| 3,554,293 | 1/1971 | Aman et al. . | |
| 3,555,680 | 1/1971 | Ford | 172/13 |
| 3,814,189 | 6/1974 | Thompson . | |
| 3,877,146 | 4/1975 | Pittinger | 30/DIG. 5 |
| 3,905,103 | 9/1975 | Ford et al. | 172/13 |
| 4,022,283 | 5/1977 | Morgan | 30/DIG. 7 |
| 4,547,966 | 10/1985 | Eden | 30/DIG. 7 |

FOREIGN PATENT DOCUMENTS

| 14887 | 5/1910 | Denmark | 172/25 |
|---|---|---|---|
| 54094 | 3/1890 | Germany . | |

*Primary Examiner*—David H. Corbin
*Assistant Examiner*—Spencer Warnick
*Attorney, Agent, or Firm*—Jacobson & Johnson

[57] ABSTRACT

A golf marker cleaner having a housing with a central bore with a set of individually retractable soil-engaging arms, each having one end pivotally connected to the housing and a second end with a soil-engaging tine to prevent movement of the soil-engaging arm, with a rotatable shaft extending through the bore in said housing and rotatably journaled therein to permit rotation of the shaft about the central axis, and a resilient pad attached to the shaft, with the resilient pad having a surface for rotatingly engaging a top surface of a marker on a golf course without marring the surface of the marker and to limit the axial displacement of soil-cutting blades connected to the shaft, with the soil cutting blade having U-shaped cutting blades located thereon to permit an operator to rotate the soil-cutting blade to cut free an annular portion of soil and grass located around the golf course marker.

11 Claims, 2 Drawing Sheets

GOLF MARKER CLEANER AND GRASS REMOVER

FIELD OF THE INVENTION

This invention relates generally to golf-course devices and, more specifically, to a speciality tool for simultaneously cleaning a golf course marker and removing the excess grass from around the golf-course marker.

1. Background of the Invention

To mark the distance or the like in a golf course, generally disk-like markers are placed in the top soft on the golf course. The top surface of the marker shows the distance to the next hole. To prevent the marker from being an obstruction to the golfer or the mowing equipment, the golf-course marker is generally sunk into the soft so that the top surface of the marker is flush with the surrounding top soft. While this provides an obstruction-free surface, oftentimes the grass grows over the top of the golf-course market, thus obscuring the marker and rendering it ineffective. In addition, rain and wind cause soil and other materials to accumulate on the top surface of the golf course marker, thus making it difficult to read the distance indicated on the surface of the marker.

The present invention provides a device and, more specifically, an improved device to allow a person to remove the grass that grows around and over the golf-course marker and to clean the top surface of the marker simultaneously and quickly. The present invention includes a set of individually retractable arms to permit individual engagement of tines with the soil to accommodate positioning of the device around the golf-course marker. A resilient marker wiping pad engages the top surface of the golf-course marker to limit the depth of the cutting blades and, during rotation, simultaneously wipes the top surface of the marker clean as the extraneous soil and grass is removed from around the golf-course marker, thus making the marker visible to the golfer.

2. Description of the Prior Art

U.S. Pat. No. 1,340,927 illustrates a device which is inserted into a golf course hole and utilized to renovate the structure of the side-walls of the hole.

U.S. Pat. No. 2,991,838 shows an electrical drill like device which is placed on the ground to bore into the earth with spinning blades.

U.S. Pat. No. 3,554,293 depicts a device which can be mounted on to a rotary power source such as a drill and when activated, weed the ground it is placed on.

U.S. Pat. No. 3,814,189 illustrates a device used to manually cut weeds located around a sprinkler head that is positioned next to a side walk.

German Patent 54,094 shows a circular grass cutting device with blades located parallel to the soil.

BRIEF SUMMARY OF THE INVENTION

Briefly, the invention comprises a golf marker cleaner and grass remover having a housing with a central bore with a a set of individually retractable soil-engaging arms each having one end pivotally connected to the housing and a second end with a soil-engaging line to penetrate the soft to prevent movement of the soil-engaging arm. A rotatable shaft extends through the bore in the housing and is rotatably journaled therein to permit rotation of the shaft about its central axis. A resilient pad attached to the lower portion of the shaft has a surface for rotatingly engaging a top surface of a marker on a golf course to wipe dean the golf course marker without marring the surface of the marker and to limit the penetration of the soil cutting knife blades into the soil. The soft cutting blade have a U-shaped cutting blades extending upward to permit a user to rotate the soil cutting blades to cut free an annular portion of soil and grass located around the golf course marker without concern for jamming or clogging of the knife blades.

DESCRIPTION OF THE PREFERRED EMBODIMENT

Figure 1:
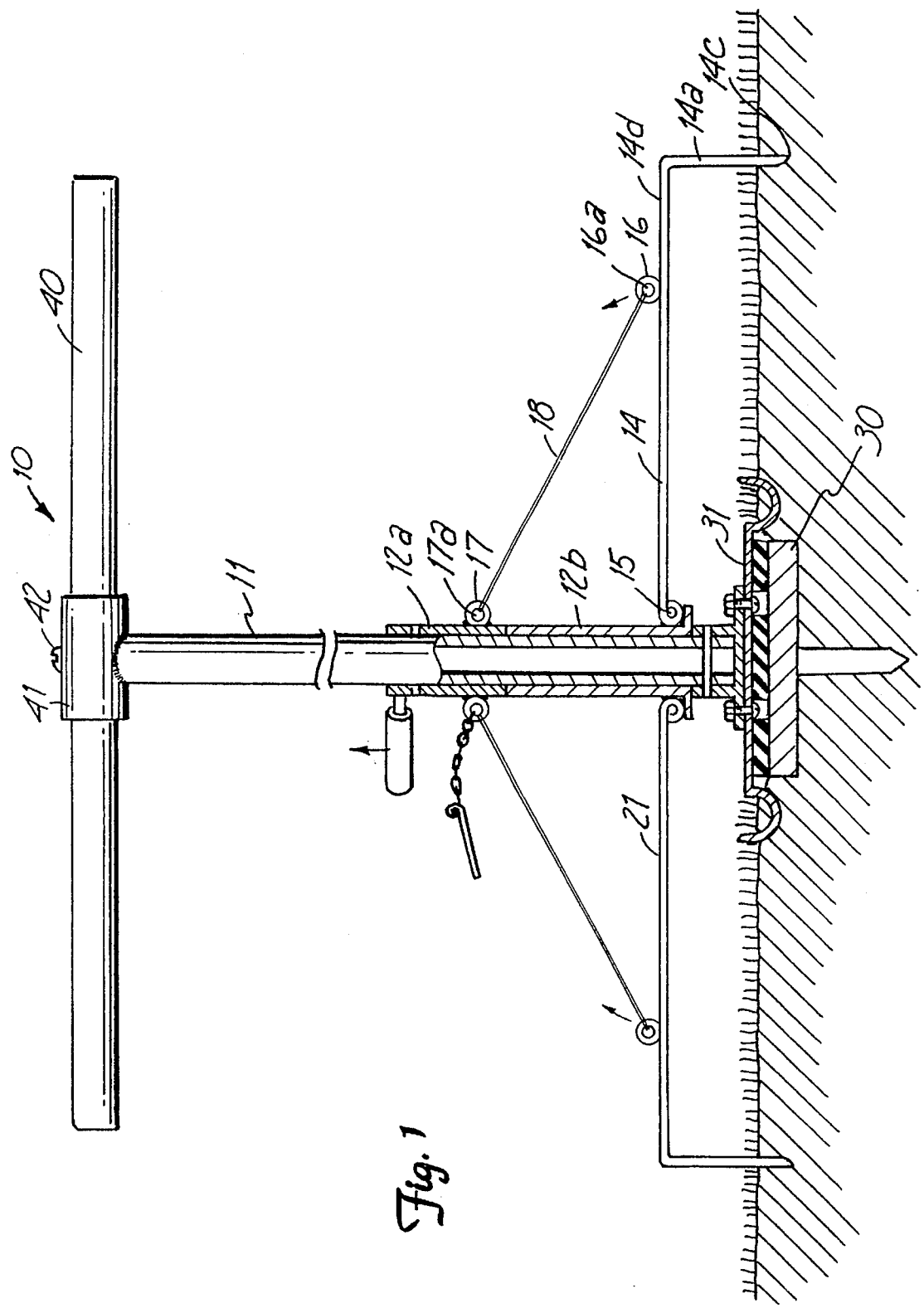
FIG. 1 shows a partial side sectional view of my invention of a golf marker cleaner and grass remover.
Figure 2:
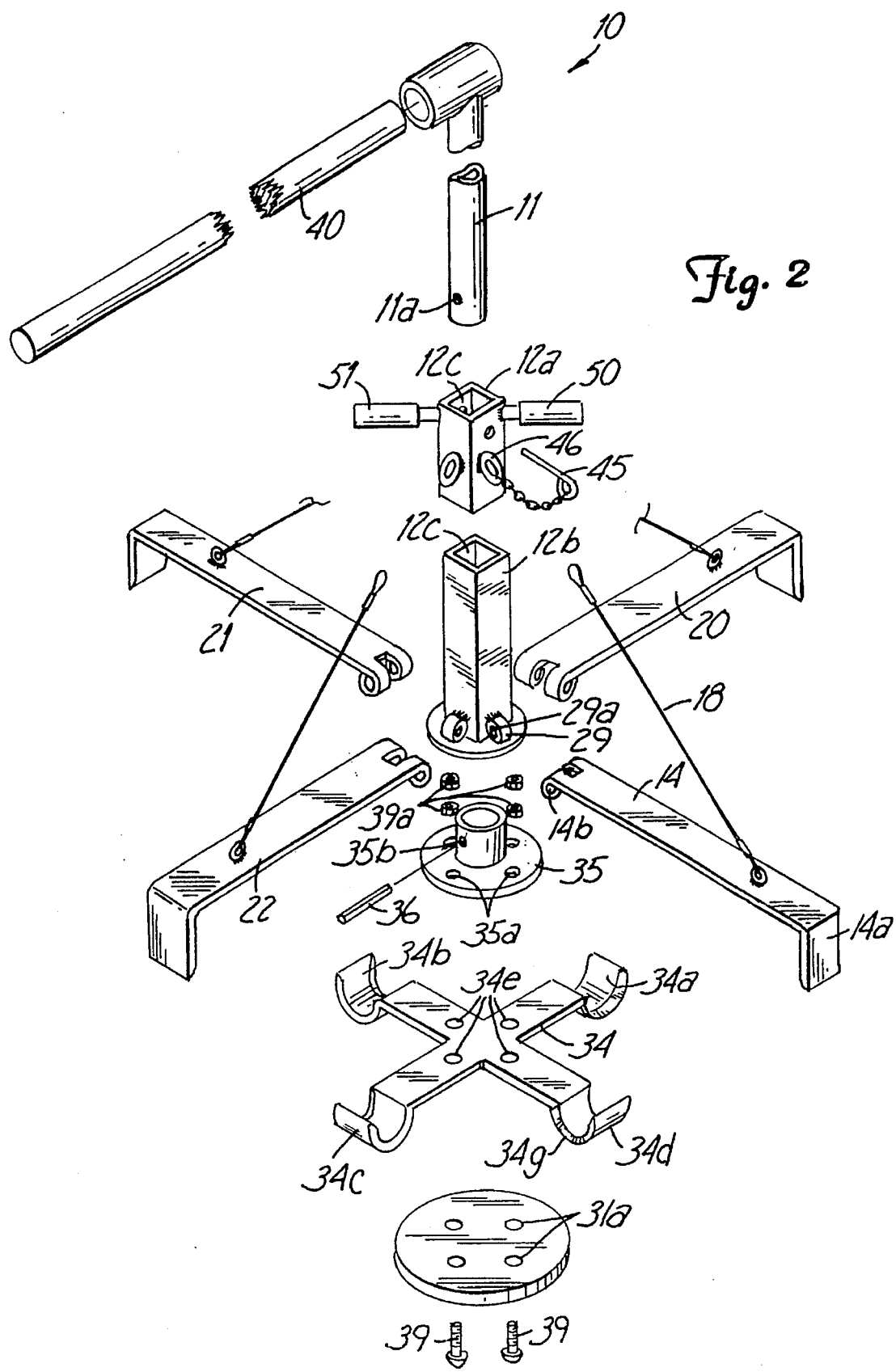
FIG. 2 shows an exploded view of the golf marker cleaner and grass remover of FIG. 1.

FIG. 1 and 2 reference numeral 10 generally identifies my golf marker cleaner and grass remover comprising a rotatable shaft 11, a two-part square hollow housing 12a and 12b, and a set of four individually retractable soil-engaging members or arms 14, 20, 21 and 22 which are pivotally connected to two part housing 12a and 12b. Connected to one end of shaft 11 is a flange 35 and a soil cutting knife 34. A set of bolts 39 extend through a pad 31 and secures soil cutting knife 34 to flange 35. A roller pin 36 extends through a hole 35b in housing 35 and through an opening 11a in shaft 11 to lock housing to shaft 11 so that rotating of shaft 11 causes rotation of soil cutting knife 34.

Each of the soil-engaging arms 14, 20, 21 and 22 are identical, so only one will be described herein. Soil-engaging arm 14 has a first end with a bore 14b for inserting a pivot pin 15 therein for pivotal engagement with a bore 29a in eye 29 on housing 12b.

FIG. 1 shows a further eye 17 located on housing 12a and an eye 16 located on soil-engaging member 14 with a flexible link 18 comprising a rope or a chain-link member having one end extending through opening 17a and secured to eye 17 and the other end extending through opening 16a and secured to eye 16. One end of soil-engaging member 14 has a tine 14a with a pointed end 14c for engagement with the soil. The use of the pivotal connection between housing 12b and arm 14 allows arm 14 to be rotated from the horizontal position to the vertical position.

My golf marker cleaner and grass remover includes a pair of hand grips formed by a cross-arm 40 which is fixedly attached to rotatable shaft 11 through a T-member 41 and a screw 42. In operation of my golf marker cleaner and grass remover, the operator pivots the soil-engaging members 14, 20, 21 and 22 a downward to the near horizontal position with the tines resting on the top of the soil. The user than steps on the outer portion 14d of arm 14 to push the line 14a into the soil. The use of the individual retractable and soil engageable tines allows one to selectively push each of the tines into the soil by stepping on the outer portions of the pivotable arms. By having individually engageable arms avoids the problem of having to simultaneously force all four tines in the soil, a problem if the soil is hard or rocky.

To operate my golf marker cleaner and grass remover, the operator grasps handle 40 and centers resilient wiping pad 31 on top of the marker 30. Wiping pad 31 is preferable made from a resilient closed cell or open cell polymer plastic and is secured to knife 34 by an adhesive or the like. With pad 31 in contact with the top surface of the marker the operator then forces each of the soil-engaging arms 14, 20, 21 and 22 into the soil to anchor the golf marker cleaner and grass remover in a centered position around marker 30. With the tines on the arms engaging the soil to prevent rotation of the housing, the operator while pushing down on cross arm 40 rotates cross arm 40 and shaft 11 which is journaled in housing 12a and 12b by a passage 12c. Rotating shaft 11 rotates knife blades 34a, 34b, 34c and 34d around the periphery of marker 30 to remove an annular shaped section of soil and grass located around the periphery of marker thus removing the grass that would normally grow over the top surface of the marker.

Each of Knife blades 34a, 34b, 34c and 34d is connected to cross arm of knife 34 with the cross member having openings 34e for receiving bolts 39. Bolts 39 extend through knife cross arm 34 and through openings 35a in housing 35. Nuts 39a secure flanged housing 35 and knife 34 to each other. Knife blades 34a, 34b, 34c and 34d are identical and only one will be described herein. Knife blade 34d has a sharp cutting edge 34g for cutting the grass roots and soil located around the golf course marker. Knife blades 34a, 34b, 34c and 34d have a general U-shape with the open portion of the U-shaped knife blade facing upward away from the soil. By having the knife blade open to the top one prevents the knife blades from clogging during use. That is, since the soil and grass roots are forced upward by the cutting action, the annular shaped soil and grass plug cut by the blades is forced upward away from the knife blades and does not plug the blades like other soil cutting devices that have blades that capture the cut soil plugs.

The soft, resilient cushioned wiping pad 31 provides a dual purpose in that it prevents the top of the marker from being scored or damaged as one rotates the soil cutting knife blades and it also acts as a stop to limit the depth the soil cutting blades extend into the ground. Thus my golf course marker requires no depth adjustment of the blades to operate since the depth position of the blades is automatically determined by the engagement of pad 31 with the top of the marker.

When the grass has been removed from around the marker, the retractable soil-engaging arms are disengaged from the soft by pivoting the arms from the horizontal to the vertical position. If the soil is loose, the operator can raise handles 50 and 51 to lift upper housing 12a, thus simultaneously pulling retractable arms 14, 20, 21, and 22 free of the soil. If the retractable arms are in tightly compacted soil, the operator can free each arm individually by merely pulling on each of the flexible links connecting the soil-engaging member to the housing to thereby pivot the tine on the soil-engaging arm free of the soil.

I claim:

1. A golf marker cleaner comprising:

a housing having a central bore with a central axis therein:

a set of retractable soil-engaging arms, each of said set of retractable soil-engaging arms having a first end pivotally connected to said housing and a second end with a soil-engaging tine to prevent movement of said soil-engaging arm;

a shaft extending through the bore in said housing and rotatably journaled therein to permit rotation of said shaft about said central axis and with respect to said housing;

a resilient pad attached to said shaft, said resilient pad having a surface for rotatingly engaging a top surface of a marker on a golf course without marring the surface of the marker, said resilient pad limiting the axial displacement of said shaft;

a soil-cutting knife connected to said shaft said soil-cutting knife having U-shaped cutting blades located thereon to permit an operator to rotate said soil-cutting knife to cut free an annular portion of soil and grass located below said housing; and a set of flexible linkages connected to said housing and to said set of retractable soil-engaging arms to limit the pivotal displacement of said set of soil-engaging arms.

2. The golf course marker cleaner of claim 1 wherein each of said set of retractable soil-engaging arms is independently pivotal to permit individual engagement of the tine of a soil-engaging arm to prevent rotation of said housing as the shaft is rotated with respect to said housing.

3. The golf course marker cleaner or claim 1 including handles to lift said housing and soil-engaging arms free of the soil around a golf marker.

4. The golf course marker cleaner of claim 2 including a set of flexible linkages connected to said housing and to said set of retractable soil-engaging arms to limit the pivotal displacement of said set of soil-engaging arms.

5. The golf course marker cleaner of claim 1 including cross arms with handles thereon to permit an operator to rotate said shaft with respect to said housing.

6. The golf course marker cleaner of claim 5 wherein each of the tines of said retractable soil-engaging arms extends substantially perpendicular to said soil-engaging arms so that the individual line on the soil-engaging arm can be driven into the ground by pressing on the soil-engaging arm.

7. The golf course marker cleaner of claim 6 wherein the U-shaped cutting blades extend radially outward from said rotatable shaft.

8. The golf course marker cleaner of claim 7 wherein said housing includes at least a top part and a bottom part, with each part journaled about said shaft to permit simultaneously pivoting of said tines free from the soil by lifting said top part with respect to said bottom part of said housing.

9. The golf course marker cleaner of claim 8 including at least four soil-cutting blades.

10. The golf course marker cleaner or claim 9 including handles on said housings to permit an operator to simultaneously engage all of said soil engaging arms.

11. A golf marker cleaner comprising:

a housing having a central bore with a central axis therein:

a set of retractable soil-engaging arms having a first end pivotally connected to said housing and a second end with a soil-engaging tine to engage the soil to prevent movement of said soil-engaging arm;

a set of members connected to said housing and said retractable soil-engaging arms to permit withdrawal of said soil-engaging tines by displacement of said members;

a shaft extending through the bore in said housing and rotatably journaled therein to permit rotation of said shaft about said central axis and with respect to said housing;

a pad attached to said shaft said pad having a surface for rotatingly engaging a top surface of a marker on a golf course without marring the surface of the marker, said pad limiting the axial displacement of said shaft; and a soil-cutting knife connected to said shaft, said soil-cutting knife having cutting blades located thereon to permit an operator to rotate said-soil cutting knife to cut free an annular portion of soil and grass located radially outward of said pad.

\* \* \* \* \*